(12) United States Patent
Ferguson et al.

(10) Patent No.: US 12,240,995 B2
(45) Date of Patent: Mar. 4, 2025

(54) AQUEOUS COATING COMPOSITION, SUBSTRATE COATED WITH SUCH COMPOSITION, PROCESS FOR CONTROLLING AQUATIC BIOFOULING USING SUCH COATING COMPOSITION

(71) Applicant: Akzo Nobel Coatings International B.V., Amsterdam (NL)

(72) Inventors: James Ferguson, West Boldon (GB); Alistair Andrew Finnie, Whitley Bay (GB)

(73) Assignee: Akzo Nobel Coatings International B.V., Amsterdam (NL)

( * ) Notice: Subject to any disclaimer, the term of this patent is extended or adjusted under 35 U.S.C. 154(b) by 776 days.

(21) Appl. No.: 17/600,664

(22) PCT Filed: Mar. 30, 2020

(86) PCT No.: PCT/EP2020/058958
§ 371 (c)(1),
(2) Date: Oct. 1, 2021

(87) PCT Pub. No.: WO2020/201213
PCT Pub. Date: Oct. 8, 2020

(65) Prior Publication Data
US 2022/0177712 A1    Jun. 9, 2022

(30) Foreign Application Priority Data
Apr. 2, 2019  (EP) .................................. 19166827

(51) Int. Cl.
| C09D 5/16 | (2006.01) |
| B32B 27/30 | (2006.01) |
| C08F 220/28 | (2006.01) |
| C09D 5/00 | (2006.01) |
| C09D 7/20 | (2018.01) |
| C09D 133/14 | (2006.01) |
| C09D 163/00 | (2006.01) |

(52) U.S. Cl.
CPC ........ C09D 5/1668 (2013.01); C08F 220/286 (2020.02); C09D 5/002 (2013.01); C09D 7/20 (2018.01); C09D 133/14 (2013.01); C09D 163/00 (2013.01); C08F 2800/20 (2013.01)

(58) Field of Classification Search
None
See application file for complete search history.

(56) References Cited

U.S. PATENT DOCUMENTS

| 2011/0046332 A1 | 2/2011 | Breiner et al. ........ C08F 226/06 |
| 2017/0102483 A1 | 4/2017 | Kawashima et al. |
| 2017/0227690 A1 | 8/2017 | Sasaki et al. |
| 2018/0359955 A1 | 12/2018 | Millar |
| 2018/0359968 A1 | 12/2018 | Millar |

FOREIGN PATENT DOCUMENTS

| CN | 104672379 A | 6/2015 | ............ C08F 220/18 |
| CN | 105504137 | 4/2016 | |
| EP | 0842960 | 5/1998 | |
| EP | 1479737 B1 | 8/2006 | ............... C09D 5/16 |
| EP | 3127420 | 2/2017 | |
| GB | 2559454 A | 8/2018 | ............... C09D 5/16 |
| JP | 62-39672 A | 2/1987 | ............... C09D 5/14 |
| JP | 62-39673 A | 2/1987 | ............... C09D 5/14 |
| JP | H11263936 | 9/1999 | |
| JP | 2000129196 | 5/2000 | |
| JP | 2003206435 A * | 7/2003 | |
| JP | 2008-50473 A | 3/2008 | .............. C08L 33/04 |
| JP | 2018177926 | 11/2018 | |
| WO | 99/33927 A1 | 7/1999 | ............... C09D 5/16 |
| WO | 2009/031804 A2 | 3/2009 | ............. G01N 33/68 |
| WO | 2011/028075 A2 | 3/2011 | ........... C09D 127/12 |
| WO | 2018134124 | 7/2018 | |
| WO | 2019049048 | 3/2019 | |

OTHER PUBLICATIONS

Machine translation of CN-104672379-A (no date).*
Machine translation of JP-2003206435-A (no date).*
Abstract of CN104672379A.

(Continued)

*Primary Examiner* — Michael J Feely
(74) *Attorney, Agent, or Firm* — Pauly, DeVries Smith & Deffner LLC

(57) ABSTRACT

The invention relates an aqueous coating composition comprising an acrylic polymer dissolved in a liquid phase comprising water and a water-miscible solvent, wherein the coating composition comprises at least 50 wt % water, and wherein the acrylic polymer is a film-forming polymer obtainable by free radical polymerization of a monomer mixture comprising in the range of from 30 to 70 wt % of a poly(ethyleneglycol) (meth)acrylic monomer a.; in the range of from 2 to 20 wt % of an alkoxysilyl or alkoxyalkylsilyl functional (meth)acrylic monomer b.; and in the range of from 10 to 68 wt % of a hydrophobic ethylenically unsaturated monomer c. The invention further relates to a substrate coated with such coating composition, to a process for controlling aquatic biofouling on a surface of a man-made object, and to use of such coating composition to control aquatic biofouling on a man-made object.

17 Claims, No Drawings

(56) References Cited

OTHER PUBLICATIONS

Abstract of JP62-39672A.
Abstract of JP62-39673A.
Abstract of JP2008-050473A.
Abstract of WO2011/028075A2.
European Search Report of Corresponding EP Application No. 19166827.6, dated Oct. 16, 2019.
International Search Report and Written Opinion of PCT/EP2020/058959, mailed Jun. 16, 2020.
International Preliminary Report on Patentability of PCT/EP2020/058959, mailed Mar. 11, 2021.
Wen Jing-Yang et al., Polymer Brush Coatings for Combating Marine Biofouling, Polymer in Polymer Science, 39 (2014) pp. 1017-1042.
"Rejection Decision," for Chinese Patent Application No. 202080026265.2 mailed Aug. 11, 2022 (9 pages) with English Translation.
Yu, Shichang "Study on preparation, structure and properties of low surface energy self-cleaning antifouling coatings," Chinese Doctoral Dissertations & Master's Theses Full-Text Database (Master), Engineering Science and Technology I, Apr. 15, 2016 (22 pages) with English translation.
"Office Action," for Japanese Patent Application No. 2021-557212 mailed Oct. 25, 2022 (4 pages), English translation only.
"Office Action," for New Zealand Patent Application No. 780606 mailed Apr. 16, 2024 (7 pages).

\* cited by examiner

AQUEOUS COATING COMPOSITION, SUBSTRATE COATED WITH SUCH COMPOSITION, PROCESS FOR CONTROLLING AQUATIC BIOFOULING USING SUCH COATING COMPOSITION

CROSS-REFERENCE TO RELATED APPLICATIONS

This application is a 35 U.S.C. § 371 national phase application of PCT Application No. PCT/EP2020/058958 (WO 2020/201213 A1), filed on Mar. 30, 2020, which claims the benefit of priority to EP Application Serial No. 19166827, filed on Apr. 2, 2019, each of which is incorporated herein by reference in its entirety.

FIELD OF THE INVENTION

The present invention relates to an aqueous coating composition, to a substrate coated with such coating composition, to a process for controlling aquatic biofouling on a surface of a man-made object, and to use of such coating composition to control aquatic biofouling on a man-made object.

BACKGROUND OF THE INVENTION

Man-made objects such as ship and boat hulls, buoys, drilling platforms, dry dock equipment, oil production rigs, aquaculture equipment and netting and pipes which are immersed in water, or have water running through them, are prone to fouling by aquatic organisms, such as green and brown algae, barnacles, mussels, and the like. Such objects often are of metal, but may also be made of other materials such as concrete, glass re-enforced plastic or wood. Such fouling is a nuisance on ship and boat hulls, because it increases frictional resistance during movement through water. As a consequence speed is reduced and fuel consumption increased. It is a nuisance on static objects such as legs of drilling platforms, and rigs for oil and gas production, refining and storage, because the resistance of thick layers of fouling to waves and currents can cause unpredictable and potentially dangerous stresses in the object, and also because fouling makes it difficult to inspect the object for defects, such as stress cracking and corrosion. It is a nuisance in pipes such as cooling water intakes and outlets, because the effective cross-sectional area is reduced by fouling, with the consequence that flow rates are reduced.

It is known that coatings with polysiloxane-based resins resist fouling by aquatic organisms. Such coatings are typically solvent-based and relatively expensive. A further disadvantage of coatings with polysiloxane-based resins is that many other resins do not adhere to surfaces contaminated with polysiloxane resins or exhibit film defects if applied to surfaces contaminated with polysiloxane resins. If a surface is contaminated with polysiloxane resin due to overspray or spilling of a polysiloxane-based coating, such surface has to be cleaned before a primer or other coating can be applied to it.

There is a need in the art for coating compositions that resist fouling, contain no or less hazardous compounds, are relatively cheap, and do not lead to contamination of other surfaces to be painted.

SUMMARY OF THE INVENTION

It has now been found that an aqueous coating composition comprising a water-diluted solution of an acrylic polymer with hydrolysable alkoxysilyl or alkoxyalkylsilyl groups in a water-miscible solvent, can suitably be used to provide fouling control properties to substrates submerged in water, such as for examples ship hulls.

Accordingly, the invention provides in a first aspect an aqueous coating composition comprising an acrylic polymer dissolved in a liquid phase comprising water and a water-miscible solvent, wherein the coating composition comprises at least 50 wt % water, and wherein the acrylic polymer is a film-forming polymer obtainable by free radical polymerization of a monomer mixture comprising:

in the range of from 30 to 70 wt % of a poly(ethyleneglycol) (meth)acrylic monomer a. of general formula (I):

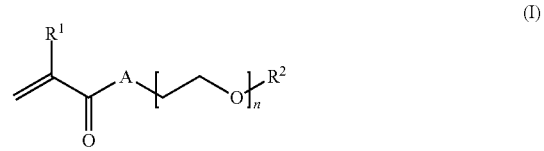

wherein:
$R^1$ is an H atom or a methyl radical;
A is an O atom or a NH radical, preferably an O atom;
$R^2$ is a H atom, an alkyl radical with 1 to 6 carbon atoms or a phenyl radical; and
n is an integer in the range of from 2 to 100;

in the range of from 2 to 20 wt % of an alkoxysilyl or alkoxyalkylsilyl functional (meth)acrylic monomer b. of general formula (II):

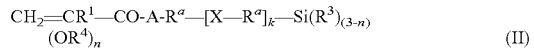

wherein:
$R^1$ is an H atom or a methyl radical;
A is an O atom or a NH radical, preferably an O atom;
$R^a$—[X—$R^a$]$_k$ is a group having from 1 to 20 carbon atoms, in which;
each $R^a$ is independently selected from (i) aliphatic hydrocarbon groups, and (ii) aromatic hydrocarbon groups optionally having one or two substituents selected from (i) above; wherein each of the aliphatic hydrocarbon and aromatic hydrocarbon groups in (i) or (ii) above can optionally be substituted with one or more substituents selected from —$C_{1-3}$ alkyl, —N($R^b$)$_2$, and —O$R^b$;
each $R^b$ is independently selected from H and $C_{1-3}$ alkyl;
X is selected from A, —C(O)O—, —OC(O)—, —C(O)NR$^b$— and —NR$^b$C(O)—;
k is a whole number in the range of from 0 to 3,
n is 1, 2, or 3, preferably is 2 or 3;
$R^3$ and $R^4$ are, independently, an alkyl or an alkoxyalkyl radical with 1 to 6 carbon atoms; and
in the range of from 10 to 68 wt % of a hydrophobic ethylenically unsaturated monomer c. selected from the group consisting of styrene,

wherein:
$R^1$ is an H atom or a methyl radical;
A is an O atom or a NH radical; and
$R^5$ is a hydrocarbon radical with 1 to 18 carbon atoms, preferably an alkyl radical with 1 to 12 carbon atoms or an (alkyl)aryl radical with 6 to 12 carbon atoms.

Compared to polysiloxane-based coating compositions, the aqueous coating composition according to the invention is cheaper and does not lead to poor adhesion of other coatings in case of contamination of surfaces or equipment with the coating composition.

In a second aspect, the invention provides a substrate coated with a coating composition according to the first aspect of the invention.

In a third aspect the invention provides a process for controlling aquatic biofouling on a surface of a man-made object, comprising the steps of:
  (a) applying a coating composition according to any one of claims 1 to 8 to at least a part of the surface of the man-made object;
  (b) allowing the coating composition to cure to form a cured coating layer; and
  (c) immersing the man-made object at least partly in water.

In a final aspect the invention provides use of the coating composition according to the first aspect to control aquatic biofouling on a man-made object.

In the further discussion below, the term "(meth)acryl" means "methacyrl or acryl". Similar terms such as "(meth)acrylate" and "(meth)acryloxy" are to be interpreted in the same way, i.e. to "methacrylate or acrylate", and to "methacryoxy or acryloxy" respectively.

DETAILED DESCRIPTION OF THE INVENTION

The coating composition according to the invention comprises an acrylic polymer dissolved in a liquid phase comprising water and a water-miscible solvent. The coating composition comprises at least 50 wt % water based on the total weight on the coating composition, preferably in the range of from 50 to 75 wt % water. Preferably, the coating composition comprises in the range of from 5 to 30 wt % of the water-miscible solvent water based on the total weight on the coating composition, more preferably of from 8 to 20 wt %. Preferably the coating composition comprises less than 5 wt %, more preferably less than 1 wt %, even more preferably less than 0.1 wt %, of organic solvents other than the water-miscible solvent.

Reference herein to a water-miscible solvent is to a solvent that has a solubility of at least 250 g per liter water at 25° C., preferably at least 300 g per liter water, more preferably at least 500 g per liter water. Solvents that are fully miscible with water in all proportions are particularly preferred. Water miscibility is determined according to ASTM D1722, using de-ionized water at 2° C.

The water-miscible solvent is a solvent for the acrylic polymer and its monomers. Preferably, the water-miscible solvent has a boiling point in the range of from 70° C. to 180° C.

Preferably, the water-miscible solvent is a mono- or di-ether of ethylene glycol or of propylene glycol with a boiling point in the range of from 70° C. to 180° C., or an alkyl alcohol having a boiling point in the range of from 70° C. to 180° C.

More preferably, the water-miscible solvent is selected from the group consisting of 1-methoxypropan-2-ol (propylene glycol methyl ether), ethylene glycol dimethyl ether, 2-butoxyethanol, ethanol, 1-propanol, 2-propanol, and 2-butanol.

The aqueous coating composition according to the invention is suitably prepared by diluting a solution of acrylic polymer in the water-miscible solvent with water.

Such solution of the acrylic polymer may comprise in the range of from 40 to 80 wt % of the acrylic polymer, preferably in the range of from 50 to 75 wt %, based on the total weight of the solution. In the aqueous coating composition, i.e. after diluting the solution of acrylic polymer with water, the concentration of the acrylic polymer may be in the range of from 10 to 40 wt %, preferably of from 15 to 35 wt %, more preferably of from 20 to 30 wt %, based on the total weight of the coating composition.

The acrylic polymer is a film-forming polymer and is obtainable by free radical polymerization of a mixture of ethylenically unsaturated monomers. Preferably, the acrylic polymer is prepared by free radical polymerization of the monomers in the water-miscible solvent. The acrylic polymer is soluble in the aqueous liquid phase of the coating composition, i.e. in the mixture of water-miscible solvent and water that is obtained upon diluting the solution of acrylic polymer with water, at a temperature of 25° C.

The monomer mixture comprises:
  in the range of from 30 to 70 wt % a poly(ethyleneglycol) (meth)acrylic monomer a.;
  in the range of from 2 to 20 wt % an alkoxysilyl or alkoxyalkylsilyl functional (meth)acrylic monomer b.; and
  in the range of from 10 to 68 wt % of a hydrophobic ethylenically unsaturated monomer c.

Monomer a. is of the following general chemical formula (I):

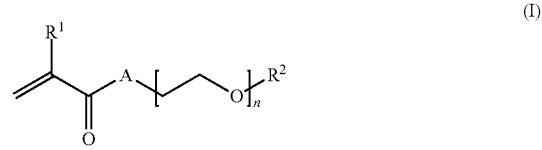

(I)

wherein:
R$^1$ is an H atom or a methyl radical;
A is an O atom or a NH radical, preferably an O atom;
R$^2$ is a H atom, an alkyl radical with 1 to 6 carbon atoms, or a phenyl radical;
and
n is an integer in the range of from 2 to 100, preferably of from 2 to 25.

Preferably, R$^2$ is a H atom, a methyl radical, an ethyl radical, or a phenyl radical, more preferably a H atom or a methyl radical. Methoxypoly(ethyleneglycol) methacrylate with a number of ethyleneglycol moieties in the range of from 2 to 25 is a particularly preferred monomer a.

The monomer mixture from which the acrylic polymer is prepared may comprise one or more monomers a. The monomer mixture comprises in the range of from 30 to 70 wt % of monomer a., preferably of from 35 to 65 wt %, more preferably of from 40 to 60 wt %, based on the total weight of monomers.

The monomer mixture further comprises in the range of from 2 to 20 wt %, preferably of from 5 to 17 wt %, more preferably of from 8 to 14 wt % of an alkoxysilyl or alkoxyalkylsilyl functional (meth)acrylic monomer b., based on the total weight of monomers. The alkoxysilyl or alkoxyalkylsilyl groups provide crosslinking functionality to the acrylic polymer. Monomer b. is of general formula (II):

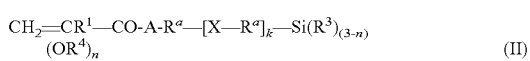

(II)

wherein:

R¹ is an H atom or a methyl radical;

A is an O atom or a NH radical, preferably an O atom;

$R^a$—$[X$—$R^a]_k$ is a group having from 1 to 20 carbon atoms, in which;

each $R^a$ is independently selected from (i) aliphatic hydrocarbon groups, and (ii) aromatic hydrocarbon groups optionally having one or two substituents selected from (i) above; wherein each of the aliphatic hydrocarbon and aromatic hydrocarbon groups in (i) or (ii) above can optionally be substituted with one or more substituents selected from —$C_{1-3}$ alkyl, —$N(R^b)_2$, and —$OR^b$;

each $R^b$ is independently selected from H and $C_{1-3}$ alkyl;

X is selected from A, —C(O)O—, —OC(O)—, —C(O)NR$^b$— and —NR$^b$C(O)—;

k is a whole number in the range of from 0 to 3, n is 1, 2, or 3, preferably 2 or 3;

R³ and R⁴ are, independently, an alkyl or alkoxyalkyl radical with 1 to 6 carbon atoms, preferably a methyl or ethyl radical.

The aliphatic $R^a$ hydrocarbon groups can be linear, branched or cyclic, or can comprise a mixture of cyclic and non-cyclic portions.

The aromatic $R^a$ hydrocarbon groups can be $C_6$-$C_{10}$ aromatic hydrocarbon groups.

In an embodiment, $R^a$—$[X$—$R^a]_k$ is $[C_mH_{2m}]$, where m is an integer in the range of from 1 to 20, preferably from 1 to 6.

In embodiments, each $R^b$ is independently selected from H and methyl, and in further embodiments, all $R^b$ groups are H.

Trialkoxysilylalkyl(meth)acrylate monomers and alkyldialkoxysilylalkyl(meth)acrylate monomers are preferred. In a preferred embodiment, A is an oxygen atom, and $R^a$—$[X$—$R^a]_k$ has from 1 to 6 carbon atoms, more preferably 3, n is 2 or 3, and R³ and R⁴ are, independently, a methyl or ethyl radical. For example, in such embodiments, $R^a$—$[X$—$R^a]_k$ can be $(C_mH_{2m})$ where m is from 1 to 6, for example 3.

Particularly preferred monomers b. are;

trimethoxysilylpropyl(meth)acrylate, triethoxysilyl propyl(meth)acrylate, methyldimethoxysilylpropyl(meth)acrylate, ethyldimethoxysilylpropyl(meth)acrylate, methyldiethoxysilylpropyl(meth)acrylate, ethyldiethoxysilylpropyl(meth)acrylate, more in particular trimethoxysilylpropylmethacrylate or triethoxysilylpropylmethacrylate.

Further examples of monomers b. include;

trimethoxysilylmethyl(meth)acrylate, triethoxysilylmethyl(meth)acrylate 3-(meth)acrylamidopropyl trimethoxysilane, 3-(meth)acrylamidopropyl triethoxysilane, N-(3-(meth)acryloxy-2-hydroxypropyl)-3-aminopropyl trimethoxysilane, N-(3-(meth)acryloxy-2-hydroxypropyl)-3-aminopropyl triethoxysilane, ((meth)acryloxymethyl)phenethyl trimethoxysilane, ((meth)acryloxymethyl)phenethyl triethoxysilane, O-((meth)acryloxyethyl)-N-(trimethoxysilylpropyl)carbamate, O-((meth)acryloxyethyl)-N-(triethoxysilylpropyl)carbamate, N-(3-(meth)acryloxy-2-hydroxypropyl)-3-aminopropyltrimethoxysilane and N-(3-(meth)acryloxy-2-hydroxypropyl)-3-aminopropyltriethoxysilane.

The monomer mixture may comprise one or more monomers b.

The monomer mixture comprises in the range of from 10 to 68 wt %, preferably of from 25 to 60, more preferably of from 20 to 50 wt % of a hydrophobic ethylenically unsaturated monomer c., based on the total weight of monomers. Monomer c. is selected from styrene, alkylated styrene, or a (meth)acrylic monomer of general formula (III):

$$CH_2=CR^1—CO\text{-}A\text{-}R^5 \qquad (III)$$

wherein:

R¹ is an H atom or a methyl radical;

A is an O atom or a NH radical; and

R⁵ is a hydrocarbon radical with 1 to 18 carbon atoms, preferably an alkyl radical with 1 to 12 carbon atoms or an (alkyl)aryl radical with 6 to 12 carbon atoms.

Monomer c. is an ethylenically unsaturated monomer without hydrophilic or crosslinkable functional groups. The monomer mixture may comprise one or more monomers c.

Preferably, monomer c. is styrene, alkylated styrene such as for example dimethyl styrene, or a $C_1$-$C_{12}$ alkyl ester of acrylic acid or methacrylic acid. More preferably, monomers c. is methyl(meth)acrylate, ethyl(meth)acrylate, isopropyl(meth)acrylate, n-butyl(meth)acrylate, isobutyl(meth)acrylate, hexyl(meth)acrylate, cyclohexyl(meth)acrylate, 2-ethylhexyl(meth)acrylate, benzyl(meth)acrylate, lauryl(meth)acrylate, isobornyl(meth)acrylate, styrene, or a mixture of two or more thereof. In a particularly preferred embodiment monomer c. is butylacrylate, methylmethacrylate or a mixture thereof.

The monomer mixture may comprise ethylenically unsaturated monomers other than monomers a., b, and c., for example vinyl monomers such as vinyl acetate, vinyl chloride, vinylidene chloride, ethyl vinyl ether, butyl vinyl ether or hydrophilic (meth)acrylic monomers other than monomer a., such as for example zwitterionic (meth)acrylic monomers or (meth)acrylic monomers with a salt group. Preferably, the monomer mixture does not comprise more than 10 wt %, preferably not more than 5 wt %, of ethylenically unsaturated monomers other than monomers a., b., and c., based on the total weight of monomers. If the monomer mixture comprises hydrophilic (meth)acrylic monomers other than monomer a., the total amount of hydrophilic (meth)acrylic monomers, i.e. the sum of monomer(s) a. and hydrophilic (meth)acrylic monomers other than monomer a., is at most 70 wt %, preferably at most 60 wt %, based on the total weight of monomers.

In one embodiment, the monomer mixture does not comprise any ethylenically unsaturated monomers other than monomers a., b., and c.

Preferably, the monomer mixture is free of fluorinated ethylenically unsaturated monomers.

The acrylic polymer is obtainable by free radical polymerization of the monomer mixture. Free radical polymerization is well known in the art and the acrylic polymer may be prepared by any known suitable free radical polymerization method. Conditions that allow the monomers to polymerize into an acrylic polymer by free radical polymerization are well-known in the art. Any suitable conditions may be applied. Suitable conditions typically include the presence of an initiator and a temperature that is sufficient to allow polymerization. Typically, the temperature during polymerization is in the range of from 50° C. to 120° C., preferably of from 70° C. to 100° C. It will be appreciated that the optimum polymerization temperature will depend on the decomposition temperature of the initiator used and the boiling points of the water-miscible solvent and monomers used.

The acrylic polymer is preferably prepared by free radical polymerization of the monomer mixture in the water-miscible solvent so that it is directly obtained as a solution in the water-miscible solvent.

Any suitable initiator may be used in a suitable amount. Suitable initiators are known in the art and include organic peroxides and azo initiators such as for example azobisisobutyronitrile (AIBN) or 2,2'-azodi(2-methylbutyronitrile) (AMBN). Suitable organic peroxides include benzoyl peroxide, lauroyl peroxide, di-t-butyl peroxide, acetyl peroxide, t-butyl peroctonate, t-amyl peroctonate, and t-butyl perbenzoate. The initiator may be added in any suitable amount, typically up to 3 mole % based on the total moles of monomers, preferably in the range of from 1.0 to 3.0 mole %. The total amount of initiator may be added in two or three steps, i.e. an amount at the start of the polymerization and a further amount during the polymerization reaction.

Optionally, a chain transfer agent is used during polymerization. Any suitable chain transfer agent may be used in a suitable amount. Suitable chain transfer agents are known in the art and include methyl mercaptoproprionate, dodecyl mercaptan, n-octyl mercaptan, thioglycolic acid, 2-mercapto ethanol, and butenediol. Optionally a polymerization catalyst is used during polymerization. Suitable catalysts are known in the art and often referred to as 'activators'.

The acrylic polymer preferably has a glass transition temperature in the range of from −25° C. to +10° C., more preferably of from −20° C. to +5° C., even more preferably of from −15° C. to +2° C. Reference herein to glass transition temperature is to the calculated Fox glass transition temperature of the non-crosslinked polymer.

The coating composition cures by condensation of silanol groups formed upon hydrolysis of the alkoxysilyl or alkoxyalkylsilyl groups. It has been found that silanol groups do not or hardly condense if the acrylic polymer is diluted as in the coating composition according to the invention. Upon drying of an applied film of the coating composition, water and water-miscible solvent evaporate and the concentration of acrylic polymer increases, resulting in silanol condensation.

The aqueous coating composition may either be provided as a water-diluted one-component composition or as a two-component composition with the acrylic polymer solution in one component and water-diluted catalyst in the other component.

Preferably, the coating composition is free of any binder polymers other than the acrylic polymer.

The aqueous coating composition may comprise a silanol condensation catalyst. Such catalyst catalyzes hydrolysis of the alkoxysilyl or alkoxyalkylsilyl groups and crosslinking of silanol groups formed upon such hydrolysis. Preferably, the coating composition comprises a silanol condensation catalyst. The catalyst may be used in any suitable amount, preferably in the range of from 0.01 to 2 wt % based on the total weight of the coating composition.

Any water-soluble catalyst suitable for catalyzing the condensation reaction between silanol groups may be used. Such catalysts are well known in the art and include tertiary amines such as for example 1,8-diazabicyclo(5.4.0)undec-7-ene (DBU), and strong acids such as para-toluene sulfonic acid, sulfuric acid, and methyl sulfonic acid. The catalyst may comprise a halogenated organic acid which has at least one halogen substituent on a carbon atom which is in the [alpha]-position relative to the acid group and/or at least one halogen substituent on a carbon atom which is in the beta position relative to the acid group, or a derivative which is hydrolysable to form such an acid under the conditions of the condensation reaction.

It has been found that silanol condensation catalysts comprising a tertiary amine group provide both catalytic activity and in-can stability of the polymer. Therefore, the silanol condensation catalyst preferably has a tertiary amine group. Examples of such catalysts include 1,8-diazabicyclo (5.4.0)undec-7-ene (DBU), 1,5,7-triazabicyclo[4.4.0]dec-5-ene (TBD), hydroxybenzotriazole, hydroxyazabenzotriazole, 5-nitropyridin-2-ol, imidazole, alkylimidazoles such as 1-methylimidazole, 2-methylimidazole, 2-ethyl-4-methyl-imidazole or 2-heptadecylimidazole, arylimidazoles such as 2-phenylimidazole, alkylarylimidazoles such as 2-phenyl-4-methylimidazole, 1,4-diazabicyclo[2.2.2]octane (DABCO), N-methyl morpholine, and tetramethylguanidine. More preferably, the silanol condensation catalyst is DBU or TBD.

To provide enhanced protection against fouling, the coating composition may comprise a biocide. Any biocide known to have biocidal activity against marine or freshwater organisms may suitably be used in a suitable amount. Suitable marine biocides are well-known in the art and include inorganic biocides such as copper oxide, copper thiocyanate and copper flake, organometallic or metal-organic biocides such as copper pyrithione, zinc pyrithione and zineb, or organic biocides such as 4,5-dichloro-2-(n-octyl)-3(2H)-isothiazolone, 2-(p-chlorophenyl)-3-cyano-4-bromo-5-trifluoromethyl pyrrole (tralopyril) and medetomidine. It is an advantage of the coating composition according to the invention that it is able to provide anti-fouling properties without biocides.

It is an advantage of the coating composition according to the invention that it can provide fouling control without biocides. Therefore, the coating composition preferably is free of biocide.

The coating composition may further comprise extender pigments (fillers) and/or color pigments and one or more additives commonly used in coating compositions.

The total amount of color and extender pigments in the coating composition is preferably in the range of from 0 to 10 weight %, more preferably of from 0 to 5 wt %, based on the total weight of the coating composition.

The total amount of additives other than biocide in the coating composition is preferably in the range of from 0 to 3 weight %, more preferably of from 0 to 2 wt %, based on the total weight of the coating composition.

The invention further relates to a substrate coated with a coating composition according to the first aspect of the invention. The coating composition can be applied by known techniques for applying liquid coating compositions, such as brush, roller, dipping, bar or spray (airless and conventional) application.

The substrate may be a surface of a structure to be immersed in water, such as metal, concrete, wood, or polymeric substrates. Examples of polymeric substrates are polyvinyl chloride substrates or composites of fiber-reinforced resins. In an alternative embodiment, the substrate is a surface of a flexible polymeric carrier foil. The coating composition is then applied to one surface of a flexible polymeric carrier foil, for example a polyvinyl chloride carrier foil, and cured, and subsequently the non-coated surface of the carrier foil is laminated to a surface of a structure to be provided with fouling-resistant and/or foul release properties, for example by use of an adhesive.

To achieve good adhesion to the substrate it is preferred to apply the coating composition to a substrate that is provided with a primer layer and/or a tie-coat layer. The primer layer may be deposited from any primer composition known in the art, for example an epoxy resin-based or polyurethane based primer composition. Preferably, the substrate is provided with a tie-coat layer deposited from a tie-coat composition, before applying a coating layer deposited from the coating composition according to the invention. The tie-coat composition may be applied to the bare substrate surface, to a primed substrate surface or to a substrate surface containing an existing layer of anti-fouling or foul release coating composition.

It has been found that a coating deposited from the coating composition according to the invention provides excellent adhesion to a tie-coat layer deposited from a tie-coat composition comprising a binder polymer with alkoxysilyl or alkoxyalkylsilyl functional groups. The tie-coat composition is a solvent-based composition wherein the binder polymer with curable alkoxysilyl or alkoxyalkylsilyl functional groups is dissolved in an organic solvent and comprises less than 10 wt % of water, preferably less than 5 wt % water, more preferably less than 1 wt % water. In one embodiment, the tie-coat composition is essentially free of water.

The binder polymer with curable alkoxysilyl or alkoxyalkylsilyl functional groups in the tie-coat composition may be any suitable binder polymer, for example polyurethane, polyurea, polyester, polyether, polyepoxy, or a binder polymer derived from ethylenically unsaturated monomers such as (meth)acrylic monomers. Such binder polymers are known in the art and for example described in WO 99/33927.

Preferably, the binder polymer is a poly(meth)acrylate with curable alkoxysilyl or alkoxyalkylsilyl functional groups. Such binder polymer is obtainable by radical polymerisation of a mixture of (meth)acrylic monomers comprising (meth)acrylic monomers with curable alkoxysilyl or alkoxyalkylsilyl functional groups, preferably monomers as described above for monomers b., and hydrophobic (meth)acrylic monomers without crosslinkable groups, in particular monomers as described above for monomers c. Preferably, the monomer mixture comprises less than 25 wt %, more preferably less than 10 wt %, even more preferably less than 5 wt %, of any (meth)acrylic monomers as described above for monomers a. or of any other hydrophilic (meth)acrylic monomers, such as (meth)acrylic acid, hydroxy-functional, alkoxy-functional, zwitterionic or salt group comprising (meth)acrylic monomers. In one embodiment, the monomer mixture is essentially free of hydrophilic (meth)acrylic monomers selected from the group consisting of monomers a. as specified above, (meth)acrylic acid, hydroxy-functional, alkoxy-functional, zwitterionic, and salt group comprising (meth)acrylic monomers.

An example of a monomer mixture for the binder polymer in the tie-coat composition is a mixture of comprising methyl methacrylate, lauryl methacrylate, and trimethoxysilylmethylmethacrylate or trimethoxysilylpropylmethacrylate.

Preferably, the binder polymer in the tie-coat composition does not have crosslinkable functional groups other than the alkoxysilyl or alkoxyalkylsilyl functional groups.

The tie-coat composition comprises an organic solvent. The solvent is preferably the solvent in which the binder polymer is prepared by free radical polymerization. Solvents in which both the monomers and the binder polymer dissolve are therefore preferred. Examples of suitable solvents include ketones such as methyl n-amyl ketone (MAK), methyl ethyl ketone (MEK), methyl isobutyl ketone (MIBK), methyl isoamyl ketone (MIAK), and hydrocarbon solvents such as xylene, toluene, trimethylbenzene. Methyl n-amyl ketone is a particularly preferred solvent. The tie-coat composition may comprise up to 50 wt % of solvent, preferably in the range of from 10 to 40 wt %, more preferably of from 20 to 35 wt %.

In order to prevent deformation or wrinkling of the tie-coat after immersion in water, it is preferred to at least partially cure the tie-coat composition before applying the aqueous coating composition according to the invention. Therefore, the tie-coat composition preferably comprises a silanol condensation catalyst, so that the tie-coat composition will at least partially cure if allowed to dry for a few hours before applying the coating composition of the invention. Suitable silanol condensation catalysts are known in the art and include carboxylic acid salts of various metals such as tin, zinc, iron, lead, barium, and zirconium, for example dibutyltin dilaurate, dioctyltin dilaurate, dibutyltin dioctoate, iron stearate, tin (II) octoate, and lead octoate; organobismuth compounds; organotitanium compounds; organo-phosphates such as bis(2-ethylhexyl) hydrogen phosphate; chelates such as dibutyltin acetoacetonate; tertiary amines such as 1,8-diazabicyclo(5.4.0)undec-7-ene (DBU). The silanol condensation catalyst may be used in any suitable amount, typically in the range of from 0.1 to 2 wt % based on the tie-coat composition.

In a preferred embodiment, the substrate is coated with a multi-layer coating system optionally comprising a primer layer applied to the substrate and deposited from a primer coating composition, and further comprising a tie-coat layer applied to the substrate or to the optional primer layer, deposited from a tie-coat composition comprising a binder polymer with curable alkoxysilyl or alkoxyalkylsilyl functional groups, and a topcoat layer applied to the tie-coat layer, wherein the topcoat layer is deposited from a coating composition according to the first aspect of the invention.

In a third aspect, the invention provides a process for controlling aquatic biofouling on a surface of a man-made object, comprising the steps of:
(a) applying an aqueous coating composition according to the first aspect of the invention on at least a part of the surface of the man-made object;
(b) allowing the coating composition to cure to form a cured coating layer; and
(c) immersing the man-made object at least partly in water.

Preferably, the process further comprises the step of applying a tie-coat layer to the at least part of the surface of the man-made object prior to applying the coating composition of step (a), wherein the tie-coat layer is deposited from a tie-coat composition comprising a binder polymer with curable alkoxysilyl or alkoxyalkylsilyl functional groups as specified above. In a particularly preferred embodiment, the tie-coat composition comprises a silanol condensation catalyst and is allowed to partially cure before applying the aqueous coating composition.

The invention will be further illustrated by means of the following non-limiting examples.

EXAMPLES

Preparation of Solutions of Acrylic Polymer

A solution of acrylic polymer was prepared from a monomer mixture as follows. To a polymerization vessel containing 1-methoxypropan-2-ol at 95° C. was dropwise added a solution of a monomer mixture and initiator (AMBN) in 1-methoxypropan-2-ol, using a peristaltic pump. The monomer solution was added at such rate that it took 4 hours. After addition was completed, a boost of initiator in 1-methoxypropan-2-ol was added and the reactor was held for 1 hour at 95° C. The polymer solution was then cooled to room temperature. The polymer solution obtained had 65 wt % of acrylic polymer.

Various solutions of acrylic polymer were prepared as described above, using different monomer mixtures A to F. In Table 1 is shown the composition of the monomer mixtures used and the Fox calculated glass transition temperature (Tg) of the resulting acrylic polymers.

TABLE 1

Composition of monomer mixtures and Tg of acrylic polymer

| Monomer mixture no. | A | B | C | D | E | F | G[c] | H[c] |
|---|---|---|---|---|---|---|---|---|
| MPEGMA[a] (wt %) | 55 | 55 | 52 | 52 | 52 | 52 | 72 | 28 |
| TMSPMA[b] (wt %) | 12 | 12 | 8 | 12 | 8 | 12 | 22 | 1.75 |
| Butylacrylate (wt %) | 6 | 0 | 2.3 | 0 | 14 | 11.6 | | 29.5 |
| Methylmethacrylate (wt %) | 27 | 33 | 37.7 | 36 | 26 | 24.4 | | 40.75 |
| Ethyl acrylate (wt %) | | | | | | | 6 | |
| Tg resulting polymer (° C.) | −10 | −2 | +2 | +2 | −14 | −14 | | |

[a]MPEGMA: methoxypoly(ethylenegycol)methacrylate (Bisomer MPEG350MA)
[b]TMSPMA: trimethoxysilylpropylmethacrylate
[c]Comparative example Preparation of Tie-Coat Composition An alkoxysilyl functional polyacrylate was prepared by copolymerizing a mixture of methyl methacrylate, lauryl methacrylate and trimethoxysilylpropyl methacrylate in the presence of mercaptopropyl trimethoxysilane as chain transfer agent and 2,2'-azodi(2-methylbutyronitrile) (AMBN) as initiator in methyl n-amyl ketone (MAK) as solvent at 100°

C. The methyl methacrylate/lauryl methacrylate/trimethoxysilylpropyl methacrylate/mercaptopropyltrimethoxy silane molar ratio was 70/12/15/3. A solution of 70 wt % polymer in MAK was obtained.

Example 1

Biofilm Release Testing 1

A coating composition according to the invention was prepared by diluting the polymer solution obtained from monomer mixture B with water until a polymer concentration of 25 wt % is obtained (composition B).

The foul release properties of a coating deposited from composition B was determined and compared with a commercially available polysiloxane-based foul release coating (Intersleek™ 1100SR, ex. AkzoNobel) and with a commercially available epoxy-based primer (Intershield™ 300, ex. AkzoNobel) as a non-foul release reference.

The coating compositions were applied on 75 mm×25 mm×2 mm plastic (PVC) test coupons and the coated substrates were immersed in an aquatic environment were marine biofouling is known to occur (Hartlepool Marina, UK). After 4 weeks of immersion, the samples were removed and tested for biofilm release in a variable-speed hydrodynamic flow-cell. The fouled test coupons were mounted in the flow cell, and fully turbulent seawater was passed across the surfaces. The water velocity was increased incrementally and was remained constant at each speed for 1 minute. Before each speed increment the slides were imaged and the amount of biofilm retained on the surface as a percentage of the total area (% cover) was assessed using image analysis software (ImageJ, version1.46r, Schneider et al. 2012). The percent cover of biofilm was averaged across 6 replicate slides, and mean percent cover was compared between surfaces at each speed. The results are shown in Table 2.

TABLE 2

Biofouling coverage (in %) at different flow rates

| Experiment | | % biofouling coverage at | | | |
|---|---|---|---|---|---|
| | | 0 m/s | 2.1 m/s | 3.1 m/s | 4.6 m/s |
| 1 | composition B (inv.) | 20 | 7.5 | 6.7 | 5.7 |
| 2 | Intersleek™ 1100SR | 24 | 7.9 | 4.5 | 2.6 |
| 3 | Intershield™ 300 | 38 | 20 | 19 | 16 |

Example 2

Biofilm Release Testing 2 (Slime Farm Test)

Coating compositions according to the invention were prepared by diluting the polymer solutions obtained from monomer mixtures C, D, E, and F with water until a polymer concentration of 25 wt % was obtained (compositions C, D, E, and F) and then adding 1 wt % of DBU as catalyst.

The foul release properties of coatings deposited from compositions C, D, E, and F and from Intersleek™ 1100SR were determined in a so-called slime farm test. The coating compositions were applied on 75 mm×25 mm×2 mm plastic (PVC) test coupons. The coated coupons were placed in the recirculation reactor of a multispecies slime culturing system. This is a recirculating artificial seawater system (temperature 22±2° C., salinity 33±1 psu (practical salinity units), pH 8.2±0.2) inoculated with a multispecies culture of wild microorganisms. The system mimics a semi-tropical environment whereby, under controlled hydrodynamic and environmental conditions, marine biofilms are cultivated and subsequently grown on coated test surfaces under accelerated conditions. After 4 weeks, the samples were removed and tested for biofilm release in a variable-speed hydrodynamic flow-cell as described in Example 1. The results are shown in Table 3.

TABLE 3

Biofouling coverage (in %) at different flow rates

| Experiment | | % biofouling coverage at | | | |
|---|---|---|---|---|---|
| | | 0 m/s | 2.1 m/s | 3.1 m/s | 4.6 m/s |
| 4 | composition C (inv.) | 99 | 96 | 28 | 4.7 |
| 5 | composition D (inv.) | 98 | 58 | 18 | 7.8 |
| 6 | composition E (inv.) | 98 | 91 | 23 | 5.1 |
| 7 | composition F (inv.) | 94 | 77 | 9.3 | 3.1 |
| 8 | Intersleek™ 1100SR | 98 | 74 | 2.1 | 0.4 |

The results in Tables 2 and 3 show that the coating compositions according to the invention show reasonable foul release properties, whilst they are less expensive and have less contamination issues compared to polysiloxane-based coating compositions.

Example 3

Drying Time, Pot Life and Shelf Life with and Without Catalyst

Coating compositions according to the invention were prepared by diluting the acrylic polymer solutions prepared from monomer mixtures A and B with water until a polymer concentration of 20 wt % or 25 wt % was obtained. To some of the coating compositions, a silanol condensation catalyst was added.

The time until coating compositions applied with 300 μm wet film thickness to glass test panels were dry-to-touch or dry-hard was determined according to ASTM D-1640/D1640M-14 (2018), Method A (at 23° C. and 50% relative humidity) using a BK dry-tack recorder.

For some of the coating compositions with catalyst, the pot life or shelf life was determined as follows.

Pot-life was determined by mixing the coating composition and the catalyst in a 20 ml vial. Viscosity was measured immediately after mixing using a Sheen CP1 cone and plate viscometer. The vial was stored at 23° C. and viscosity was periodically measured. The pot-life was defined as the time until the viscosity has increased 1.5 times the original value.

Shelf-life was determined by mixing the coating composition and the catalyst in a 20 ml vial and storing the vial at 45° C. The viscosity was measured after 1, 2 and 3 days, then after 1, 2 and 3 weeks and thereafter monthly, using a Sheen CP1 cone and plate viscometer. The shelf-life was defined as the time until the composition has gelled.

The coating compositions comprising DBU as silanol condensation catalyst show a long pot-life and, if diluted to a polymer concentration of 20 wt %, a remarkably long shelf-life.

TABLE 4

Drying times, pot-life and shelf-life of coating compositions with and without catalyst

| Experiment | monomer mixture | wt % polymer in coating composition | catalyst | Dry-to-touch (h) | Dry-hard (h) | Pot-life | Shelf-life |
|---|---|---|---|---|---|---|---|
| 9 | A | 20 | no | | >24 | | <24 h |
| 10 | A | 20 | 1% DBU | 0.20 | 1.04 | | >5 months |
| 11 | A | 25 | no | 0.61 | >24 | | <24 h |
| 12 | B | 25 | no | 0.43 | >24 | | <24 h |
| 13 | A | 25 | 0.05% DBU | | 3.28 | 3 h | |
| 14 | A | 25 | 1% DBU | 0.40 | 2.84 | 35 days | <24 h |
| 15 | B | 25 | 1% DBU | 0.29 | 2.51 | | |
| 16 | A | 25 | 0.5% p-TSA | | 2.08 | 1 h | |

Example 4

Adhesion to Primers and Tie-Coats after Sea Water Immersion

A coating composition according to the invention was prepared by diluting the polymer solution obtained from monomer mixture A with water until a polymer concentration of 25 wt % was obtained. Then, 1 wt % of DBU was added as silanol condensation catalyst.

The coating composition thus obtained was applied on various undercoats deposited from various primer or tie-coat compositions and the adhesion strength of the coating to the undercoating after seawater immersion was determined as follows.

A 30 cm×8 cm×2 cm PVC test panel was surface roughened using sandpaper and then degreased with solvent. Sections of the panels were then brush coated with an undercoat that was allowed to dry at 23° C. and 50% relative humidity. The coating composition according to the invention was then applied using a 300 μm Sheen cube applicator and allowed to dry for 3 days at 23° C. and 50% relative humidity. The test panel was then immersed in natural seawater (conductivity of 42.6 mS/cm) at 22° C. After 6 days, adhesion between undercoat and topcoat was qualitatively assessed by using a penknife blade to cut through and remove a small section of the coatings down to the substrate. The exposed section was rubbed by a finger and the adhesion between undercoat and topcoat was given a rating between 0 (very poor adhesion) and 5 (very good adhesion).

The following undercoats were used:
Epoxy primer: Intershield™ 300 allowed to dry for 24 hours.
Tie-coat composition 1: tie-coat composition prepared as described above under "Preparation of tie-coat composition", allowed to dry for 6 hours.
Tie-coat composition 2: tie-coat composition 1 with 0.025 wt % bis-2-(ethylhexyl) hydrogen phosphate as catalyst added just before application, allowed to dry for 6 hours.

TABLE 5

Adhesion to undercoat after seawater immersion

| Experiment | undercoat | adhesion rating | comment |
|---|---|---|---|
| 17 | Epoxy primer | 3 | no wrinkling |
| 18 | Tie-coat composition 1 | 5 | wrinkling of cured tie-coat film |
| 19 | Tie-coat composition 2 | 5 | no wrinkling |

Example 5

Comparative Examples

Example H was insoluble in water.
Example G was dissolved in water at concentrations of 20 wt % and 25 wt %. 1 wt % DBU was then added.
The 25 wt % solution gelled within 2 minutes.
The 20 wt % solution was applied to a PVC substrate with a tie-coat composition 2 undercoat (see above under Example 4).
A polymer A according to Example 14 above was also applied to a PVC substrate with a tie-coat composition 2 undercoat.
The two coated substrates were then immersed in seawater according to the procedure detailed above in Example 4, except that the duration was 24 hours and not 6 days.
The composition comprising comparative polymer G (with high MPEGMA monomer content) exhibited delamination, and also severe blistering and bubbling of the coating, whereas no such defects were observed in the polymer A-containing composition.

The invention claimed is:

1. An aqueous coating composition comprising an acrylic polymer dissolved in a liquid phase comprising water and a water-miscible solvent, wherein the coating composition comprises at least 50 wt % water, and wherein the acrylic polymer is a film-forming polymer obtained by free radical polymerization of a monomer mixture comprising:
in the range of from 30 to 70 wt % of a poly(ethyleneglycol) (meth)acrylic monomer a. of general formula (I):

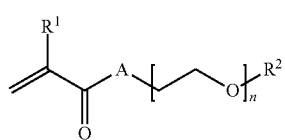

(I)

wherein:
R$^1$ is an H atom or a methyl radical;
A is an O atom or a NH radical;
R$^2$ is a H atom, an alkyl radical with 1 to 6 carbon atoms or a phenyl radical; and
n is an integer in the range of from 2 to 100;
in the range of from 2 to 20 wt % of an alkoxysilyl or alkoxyalkylsilyl functional (meth)acrylic monomer b. of general formula (II):

$$CH_2=CR^1-CO-A-R^a-[X-R^a]_k-Si(R^3)_{(3-n)}(OR^4)_n$$

(II)

wherein:
R¹ is an H atom or a methyl radical;
A is an O atom or a NH radical;
$R^a$—$[X$—$R^a]_k$ is a group having from 1 to 20 carbon atoms, in which;
each $R^a$ is independently selected from (i) aliphatic hydrocarbon groups, and (ii) aromatic hydrocarbon groups optionally having one or two substituents selected from (i) above; wherein each of the aliphatic hydrocarbon and aromatic hydrocarbon groups in (i) or (ii) above can optionally be substituted with one or more substituents selected from —$C_{1-3}$ alkyl, —$N(R^b)_2$, and —$OR^b$;
each $R^b$ is independently selected from H and $C_{1-3}$ alkyl;
X is selected from A, —C(O)O—, —OC(O)—, —C(O)NR^b— and —NR^bC(O)—;
k is a whole number in the range of from 0 to 3;
n is 1, 2, or 3, preferably is 2 or 3;
R³ and R⁴ are, independently, an alkyl or an alkoxyalkyl radical with 1 to 6 carbon atoms; and
in the range of from 10 to 68 wt % of a hydrophobic ethylenically unsaturated monomer c. selected from the group consisting of styrene, alkylated styrene, and a (meth)acrylic monomer of general formula (III):

$$CH_2=CR^1-CO-A-R^5 \qquad (III)$$

wherein:
R¹ is an H atom or a methyl radical;
A is an O atom or a NH radical; and
R⁵ is a hydrocarbon radical with 1 to 18 carbon atoms.

2. A coating composition according to claim 1 comprising in the range of from 15 to 35 wt % of the acrylic polymer, based on the total weight of the coating composition.

3. A coating composition according to claim 1, wherein the poly(ethyleneglycol) acrylic monomer a. is of general formula (I),
R² is a H atom, a methyl radical, an ethyl radical, or a phenyl radical, and n is an integer in the range of from 2 to 100.

4. A coating composition according to claim 3, wherein R² in formula (I) is a methyl radical.

5. A coating composition according to claim 1, wherein the water-miscible solvent is a mono- or di-ether of ethylene glycol or of propylene glycol with a boiling point in the range of from 70° C. to 180° C., or is an alkyl alcohol having a boiling point in the range of from 70° C. to 180° C.

6. A coating composition according to claim 1, wherein monomer b. is of general formula (II) and A is an O atom, m is an integer in the range of from 1 to 6, n is 2 or 3, and R³ and R⁴ are, independently, an alkyl radical with 1 to 6 carbon atoms.

7. A coating composition according to claim 6, wherein R³ and R⁴ in formula (II) are, independently, a methyl or ethyl radical.

8. A coating composition according to claim 1, wherein the monomer c. is butylacrylate, methylmethacrylate, or a mixture thereof.

9. A coating composition according to claim 1, in which the moiety $R^a$—$[X$—$R^a]_k$ in monomer b. is $(C_mH_{2m})$, where m is an integer in the range of from 1 to 20.

10. A coating composition according to claim 1, further comprising a silanol condensation catalyst which optionally has a tertiary amine group.

11. A coating composition according to claim 1, wherein A in formula (I) and/or formula (II) is O.

12. A coating composition according to claim 1, wherein n in formula (II) is 2 or 3.

13. A coating composition according to claim 1, wherein R⁵ in formula (III) is an alkyl radical with 1 to 12 carbon atoms or an (alkyl) aryl radical with 6 to 12 carbon atoms.

14. A substrate coated with a multi-layer coating system comprising:
optionally a primer layer applied to the substrate and deposited from a primer coating composition;
a tie-coat layer applied to the substrate or to the optional primer layer, deposited from a tie-coat composition comprising a binder polymer with curable alkoxysilyl or alkoxyalkylsilyl functional groups dissolved in an organic solvent and comprising less than 10 wt % of water, the tie-coat composition further comprising a silanol condensation catalyst; and
a topcoat layer applied to the tie-coat layer, the topcoat layer deposited from a coating composition according to claim 1.

15. A substrate according to claim 14, wherein the binder polymer in the tie-coat composition is a poly(meth)acrylate with curable alkoxysilyl or alkoxyalkylsilyl functional groups.

16. A process for controlling aquatic biofouling on a surface of a man-made object, comprising the steps of:
(a) applying a coating composition according to claim 1 to at least a part of the surface of the man-made object;
(b) allowing the coating composition to cure to form a cured coating layer; and
(c) immersing the man-made object at least partly in water.

17. A process according to claim 16, further comprising the step of applying a tie-coat layer to the at least part of the surface of the man-made object prior to applying the coating composition of step (a), wherein the tie-coat layer is deposited from a tie-coat composition, wherein the tie-coat composition comprises a silanol condensation catalyst and a binder polymer with curable alkoxysilyl or alkoxyalkylsilyl functional groups dissolved in an organic solvent and comprising less than 10 wt % of water, and the tie-coat composition is allowed to partially cure before applying the coating composition of step (a).

* * * * *